United States Patent
Wakeen et al.

(10) Patent No.: US 6,655,668 B1
(45) Date of Patent: Dec. 2, 2003

(54) UNIVERSAL VIBRATION DAMPER

(76) Inventors: Paul J. Wakeen, 2660 County Rd. D, Woodville, WI (US) 54028; Larry W. Jacoby, N. 12835 County Rd. Q., Downing, WI (US) 54734

(*) Notice: Subject to any disclaimer, the term of this patent is extended or adjusted under 35 U.S.C. 154(b) by 9 days.

(21) Appl. No.: 10/235,464

(22) Filed: Sep. 4, 2002

(51) Int. Cl.[7] .................. B60G 13/00; B60G 15/00; F16F 11/00; F16F 7/00
(52) U.S. Cl. .................. 267/195; 267/136; 267/182; 248/603
(58) Field of Search .................. 267/195, 196, 267/201, 202, 203, 292, 136, 139, 140, 140.11, 153, 182; 248/603, 637

(56) References Cited

U.S. PATENT DOCUMENTS

| | | | |
|---|---|---|---|
| 4,480,881 A | 11/1984 | Fujimori | 310/90 |
| 4,838,112 A * | 6/1989 | Barner | 74/527 |
| 4,881,350 A * | 11/1989 | Wu | 52/167.5 |
| 5,330,165 A * | 7/1994 | van Goubergen | 267/141 |
| 5,364,059 A | 11/1994 | Kimoshita et al. | 248/584 |
| 5,599,106 A | 2/1997 | Kemeny | 384/36 |
| 5,599,108 A | 2/1997 | Ochiai et al. | 384/123 |
| 5,681,023 A | 10/1997 | Sheydayi | 248/638 |
| 6,296,238 B1 | 10/2001 | Lund-Andersen | 267/294 |
| 6,315,455 B1 | 11/2001 | Tanaka et al. | 384/492 |
| 6,357,717 B1 | 3/2002 | Kennard, IV | 248/638 |
| 6,499,570 B2 * | 12/2002 | Chu | 188/129 |
| 6,536,736 B2 * | 3/2003 | Wayne et al. | 248/664 |
| 6,539,821 B2 * | 4/2003 | Bugosh | 74/422 |

* cited by examiner

Primary Examiner—Christopher P. Schwartz
Assistant Examiner—Devon Kramer
(74) Attorney, Agent, or Firm—Vidas, Arrett & Steinkraus, P.A.

(57) ABSTRACT

A device for the control of vibrations comprises a retainer resting on a base and a plurality of bearings disposed within the retainer. The bearings are arranged in a first layer and a second layer. The second layer is disposed on the first layer. The first layer comprises three or more bearings and the second layer comprising one or more bearings. Each bearing in the first layer is constrained on its bottom only by a substantially flat portion of the base, on its side by the retainer and is in contact with at least two adjacent bearings in the first layer. The bearings in the first layer support the bearing in the second layer. The retainer has a surface which is in substantially tangential contact with the bearings in the first layer.

39 Claims, 6 Drawing Sheets

UNIVERSAL VIBRATION DAMPER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The presence of unwanted vibrations in audio and optical equipment, as well as in many types of electronic equipment and other devices, can lead to degradation in the performance of the devices. Specifically, undamped vibration, movement or shocks, in audio equipment including speakers, amplifiers, microphones, audio mixers and related equipment can lead to degradation in the quality of the signal output from the device. Similarly, vibrations in optical based and other types of equipment such as telescopes, microscopes, compact disk players (and similar devices), computer disk drives, photographic equipment, etc., can lead to a degradation in the information received from the device. In another example, undamped vibrations in electronic equipment, particularly vibrations resulting from fans or other cooling units in computers and computer components may lead to a reduction in performance and/or functional life of the computer or component.

There have been many devices that have been constructed to reduce or eliminate unwanted vibrations. There remains, however, a need in the art for effective, affordable isolation devices which are capable of effectively isolating apparatuses and reducing, if not eliminating unwanted vibrations.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

The present invention may be directed to a variety of embodiments or forms. In at least one embodiment, the invention is directed to a device for the control of vibrations comprising a retainer resting on a base and a plurality of bearings disposed within the retainer.

The bearings are arranged in at least two layers such as a first layer and a second layer. The second layer is disposed on the first layer. The first layer comprises three or more bearings. The second layer comprises at least one bearing. Each bearing in the first layer is constrained on its bottom by the base, on its side by the retainer and optionally in contact with at least two adjacent bearings in the first layer. The bearings in the first layer support the bearing in the second layer. Optionally, the one or more bearings in the second layer may be larger than the bearings in the first layer. The retainer has a surface which is in substantially tangential contact with the bearings in the lower layer. Desirably, the retainer has an inner wall in contact with the bearings in the lower layer, the inner wall being substantially vertical in a region of contact with the bearings.

The bearings may be of any shape desired, however in at least one embodiment the bearings are substantially spherical in shape in order to minimize contact between the bearings and adjacent surfaces of the retainer or components. In some embodiments at least one of the bearings defines a substantially flat surface.

The retainer may be provided in a number of different forms. In one form, the retainer is in the form of a collar, desirably, annular. The retainer may also take other forms including a coil and a plurality of interconnected springs or biasing members disposed about the bearings.

In some embodiments the retainer may be made of a resilient material or of a material which is made resilient by any suitable means including, for example, by providing a plurality of slits therein. As an example of the latter, the retainer may be formed so as to have a plurality of petals.

In various embodiments the bearings may be made of suitable materials including, but not limited to tungsten carbide, aluminum oxide or other ceramic materials, chrome, steel, glass, marble and Delrin. The bearings may also be provided with a coating such as Teflon.

Additional layers of bearings may also be used in the inventive devices.

Desirably, the device further comprises a housing with an opening therein. The collar and bearings may be disposed within the housing with a portion of the second layer extending through the opening.

Some embodiments of the invention will be used in combination with an audio device, an optical device or other vibration sensitive devices. Desirably, three or more of the inventive devices are used to isolate an audio, magnetic, optical, electronic or any other component that may be affected by vibrations. To that end, the invention is directed to the combination of an audio, optical or photograph device and the inventive devices disclosed herein.

The invention is also directed to an acoustic device comprising a plurality of supports. Each support comprises a retainer, desirably in the form of collar, resting on a base and a plurality of bearings disposed within the retainer and arranged in a first layer and a second layer. The second layer is disposed on the first layer. The first layer comprises three or more bearings and the second layer comprises a bearing. The retainer has an inner surface in contact with the bearings in the lower layer. Desirably, the inner surface is in the form of a wall which is substantially vertical in a region of contact with the bearings. The bearings in the first layer support the bearing(s) in the second layer.

Device that may benefit from the present invention are typically in the fields of optical and audio equipment such as: compact disk player (including players, recorders, and other similar devices for use with any form of media such as a compact audio disk (CD), digital video disk (DVD), etc), a speaker, VCR, phonographs, cameras, a microphone, a mixer, a digital to analog device, an analog to digital device, an amplifier, a turntable, etc.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 1:
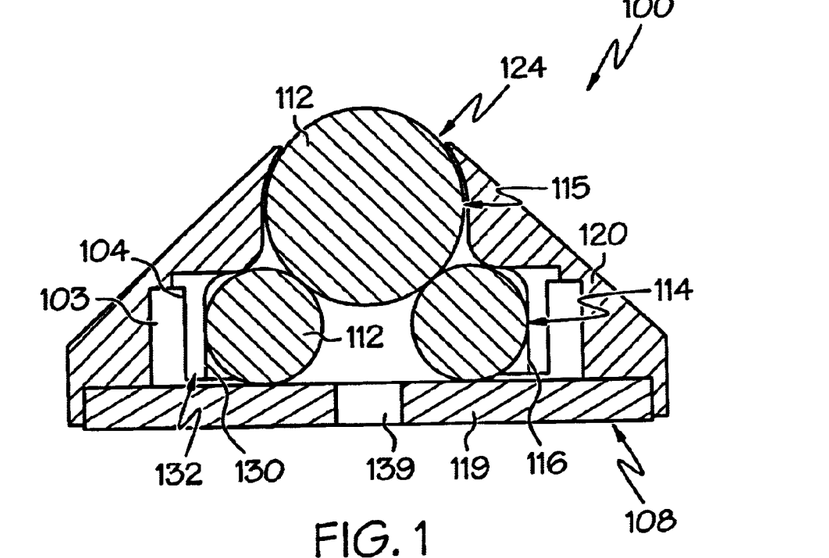
FIG. 1 shows a cross-sectional view of an embodiment of the invention.

In one embodiment, the invention is directed to a device for the control of vibrations. As shown in FIG. 1, device 100 comprises a retainer 104, a base 108 and a plurality of bearings 112 disposed within the retainer. Bearings 112 are arranged in a first layer of bearings 114 and a second layer of bearings 115. The second layer is disposed on the first layer.

The bearings 112 of the various layers may be made of suitable materials including, but not limited to tungsten carbide; aluminum oxide or other ceramic materials such as ruby, sapphire, etc.; chrome, steel or other metals or alloys thereof; glass; marble; and/or Delrin among other materials. The bearings may also be provided with a coating of Teflon and/or other material.

Figure 4:
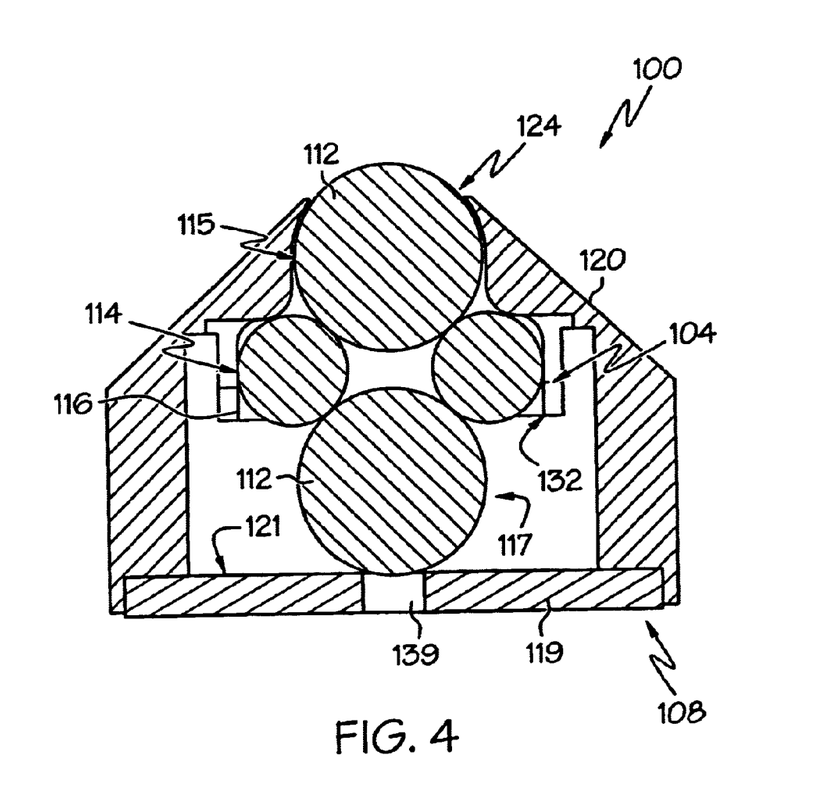
FIG. 4 shows a cross-sectional view of an embodiment of the invention.

The embodiment of FIG. 1 shows two layers of bearings. In other embodiments of the invention, an example of which is shown in FIG. 4, additional layers of bearings may also be included. Also, the second or upper layer(s) 115 may have a single bearing 112 or a plurality of bearings 112.

Desirably, as shown in FIG. 1, the device 100 further comprises a housing 120 with an opening 124 therein. The retainer 104 and bearings 112 are disposed within the housing with a portion of the second layer 115 extending through the opening 124 defined by the housing 120. Opening 124 has a diameter smaller than that of the bearing 112 of the second layer 115, thereby allowing a portion of the second bearing layer to protrude from the opening 124, but preventing the second bearing layer 115 from exiting the confines of the housing 120.

Figure 2:
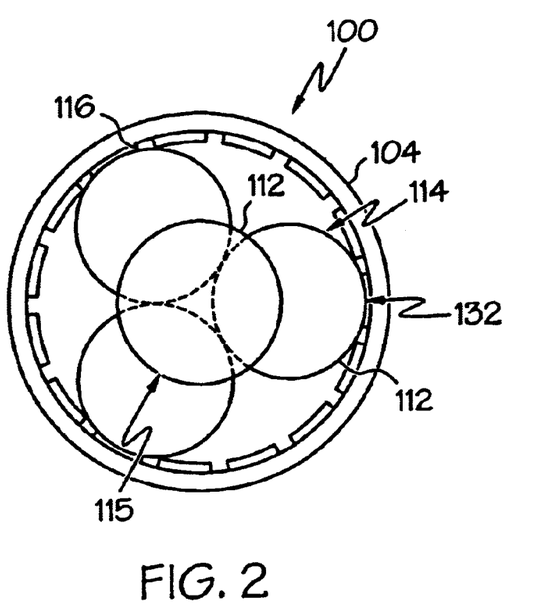
FIG. 2 shows a top down view of an embodiment of the invention.

The first layer 114 of bearings is comprised of at least three bearings 112, such as are shown in FIG. 2. The second layer 115 comprises one or more bearings 112. As best shown in FIG. 1, each bearing 112 in the first layer 114 may be constrained on its bottom by a base 108, on a side by the retainer 104. Each bearing 112 of the first layer 114 is optionally also in contact with one or more adjacent bearings 112 in the first layer 114 and at least one bearing 112 of the second layer 115. In some embodiments when a force is applied to the bearing 112 of the second layer 115, the bearings 112 of the first layer may be moved apart from one another. The bearings in the first layer 114 support the bearing or bearings in the second layer 115.

Figure 3:
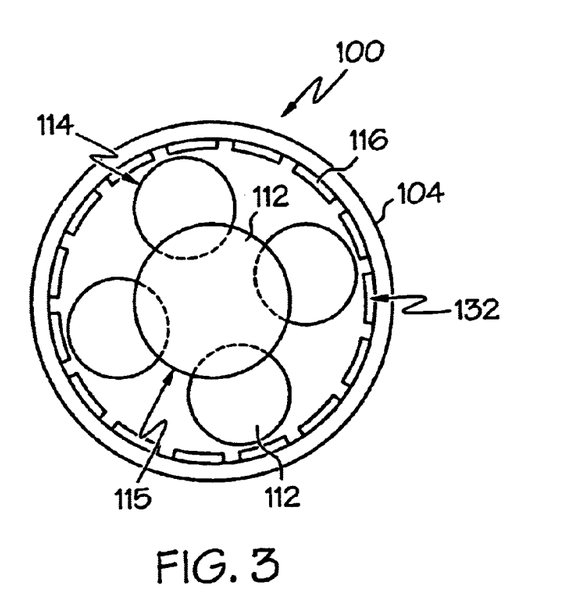
FIG. 3 shows a top down view of an embodiment of the invention.

In the embodiment shown in FIG. 3 the first layer 114 comprises four bearings 112. The bearings 112 of the first layer each have a sufficiently small diameter so as to permit the bearings 112 to freely move within the confines of the retainer 104 as limited by the central position of the bearing 112 of the second layer 115. When a compressive force is applied to the second layer 115 the bearings 112 of the first layer 114 will preferably move apart from one another to equally disperse the load applied to the second layer 115.

Device 100 may comprise more than two layers of bearings 112. In the embodiment of the invention shown in FIG. 4, the base 108 of the device 100 further comprises a base layer 117 of at least one bearing 112 which is in contact with a base member 119. The first layer 114 of bearings 112 rests upon the base layer 117.

It is desirable to minimize contact between the base member 119 and the bearing(s) 112 of the base layer 117. In at least one embodiment, bearing 112 of the base layer 117 is in rolling tangential contact with the base member 119. To further minimize contact between member 119 and base layer 117, in some embodiments the base member 119 defines a substantially flat, substantially smooth surface 121 upon which the layer 117 contacts. Layer 117 and/or surface 121 may comprise a coating of Teflon or other material as well.

In some embodiments, the base 108, or more particularly base member 119 is engaged to the housing 120 and/or the retainer 104.

In the various embodiments described herein the base 108 may be a platform such as base member 119 integral with and/or engaged to the housing 120 and/or retainer 104. Base member 119 such as is shown in FIGS. 1 and 4 may define one or more openings 139 through which Alternatively, in some embodiments base 108 comprises a surface of a table, shelf, floor, or other location that bearings 112 of are directly in contact with.

Figure 5:
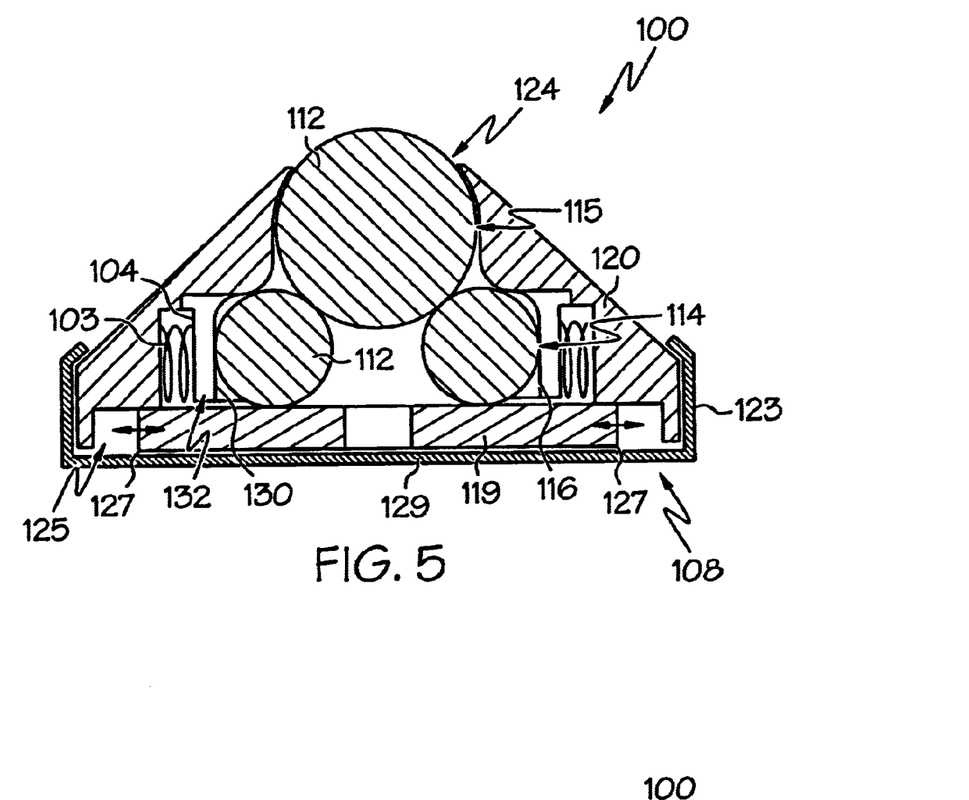
FIG. 5 shows a cross-sectional view of an embodiment of the invention.

As indicated above, in some embodiments, Teflon and/or other coatings or lubricants may be utilized on bearings 112 or on component surfaces adjacent thereto. In at least one embodiment, such as is shown in FIG. 5 the base 108 comprises a first base member 119 and a second base member 123. Housing 120 and the second base member 123 define an annular space 125 within which first base member 119 is positioned. Annular space 125 defines a diameter that is greater than that of the first base member 119. As a result, first base member 119 is capable of lateral movement, as indicated by arrows 127, within the confines of the annular space 125 defined by the housing 120.

In some embodiments second base member 123 is moveably engaged to the housing 120. Second base member 123 may be optionally capable of limited lateral movement relative to the housing 120.

In some embodiments, between first base member 119 and second base member 123 may be a layer 129 of fluid or a mutual coating of Teflon, oil, water or other lubricious substance. Preferably first base member 119 effectively floats upon the lubricious layer 129. In some embodiments first base member 119 and second base member 123 may have opposing magnetic fields.

As is shown in FIG. 1, the one or more bearings 112 in the second layer 115 may be larger or of a different shape than the bearings 112 in the first layer 114. In other embodiments of the invention, the one or more bearings 112 of the second layer 115 may be the same size as, or smaller than the bearings 112 in the first layer 114.

In order to minimize contact between the bearings 112 of the various layers, bearings 112 are typically substantially spherical in shape. However in some embodiments, an example of which is shown in FIG. 6, in addition to providing the second layer 115 with a bearing 112 of larger diameter than the bearings of the first layer 114, one more bearings 112 may be provided with a substantially flat surface 102 with which to engage a surface of a component or base such as is depicted in FIG. 8.

Figure 6:
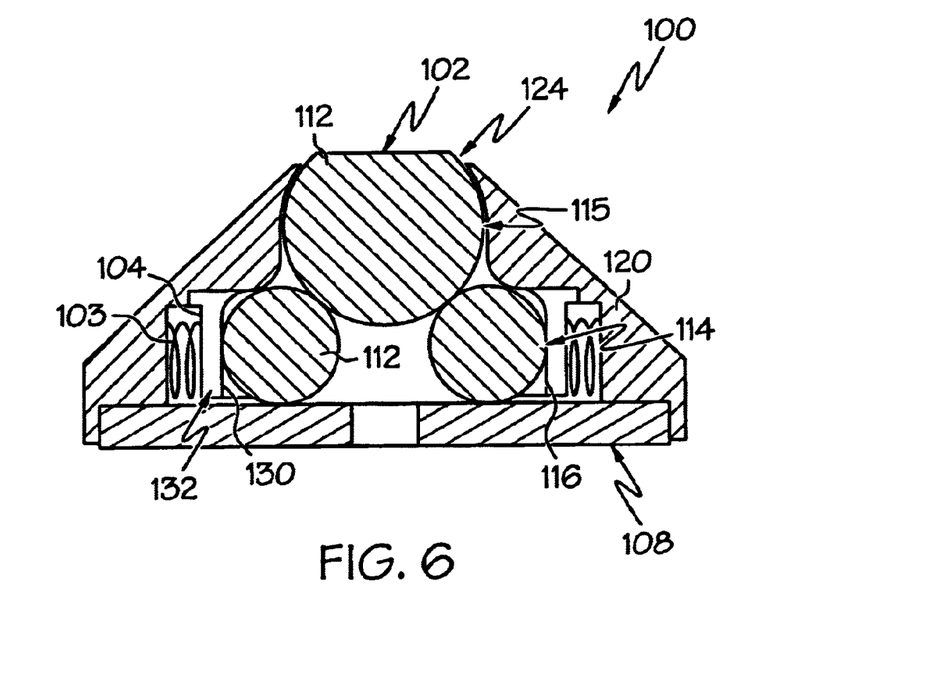
FIG. 6 shows a cross-sectional view of an embodiment of the invention.

While in many embodiments it is desirable to minimize contact between the bearing 112 and adjacent surfaces, in the embodiment shown in FIG. 6 the substantially flat surface 102 provided to the bearing 112 of the upper or second layer 115 allows the layer 115 to more securely contact and support a component.

Figure 7:
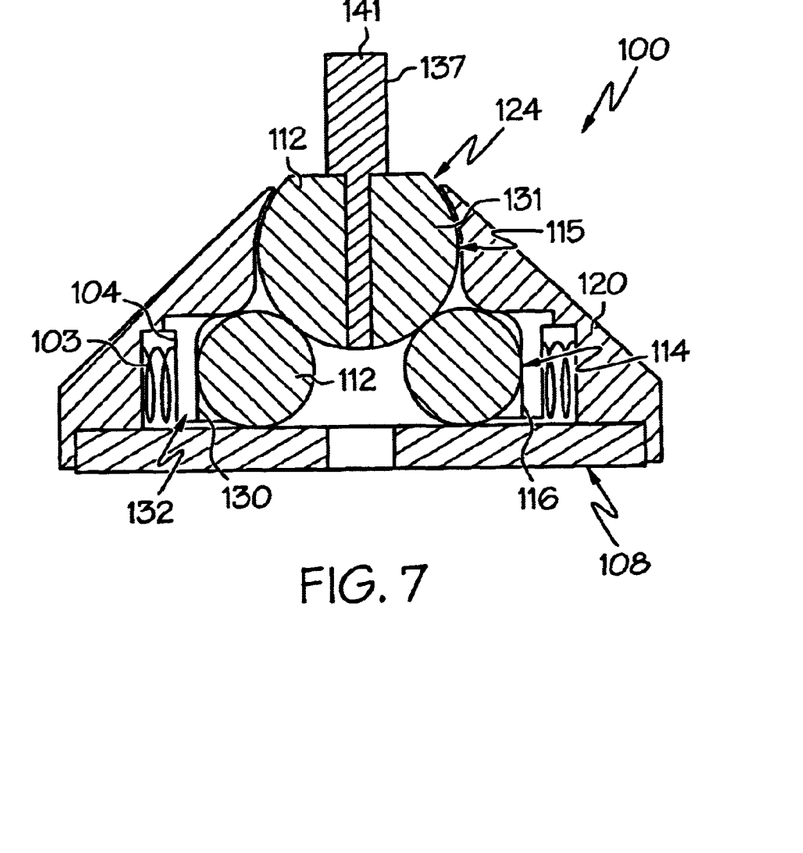
FIG. 7 shows a cross-sectional view of an embodiment of the invention.

In yet another embodiment of the invention shown in FIG. 7 one or more bearings 112 of the second layer 115 defines a rounded portion 131 and at least one post member 137 which extend outwardly from the rounded portion 131. In the embodiments shown, the rounded portion 131 is moveably retained within the housing 120 by the relatively smaller diameter of the opening 124. By applying directive force to the post member 137, the rounded portion 131 permits the post member 137 to be positioned at a variety of angles relative to the housing 120.

Figure 8:
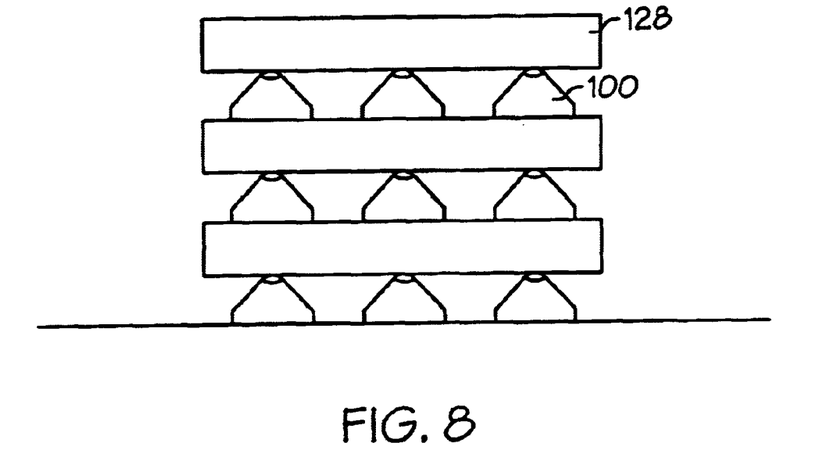
FIG. 8 shows a frontal view of an embodiment of the invention.

At a second or top end 141 of the post member 137, the post member 137 may be engaged to a surface of a component 128 (shown in FIG. 8). Post member 137 may have a length sufficient to allow the device 100 to be positioned at various distances from a component to which it is engaged while continuing to provide a vibration dampening capability.

In some embodiments post member 137 is integral with the rounded portion 131 or may be a separate fixture that is engaged to the rounded portion 131 such as by frictional, adhesive, or other form of engagement. In the embodiment shown in FIG. 7 the post member 137 is threadingly engaged to the rounded portion 131 of the bearing 112 of the second bearing layer 115.

As indicated above, the bearings 112 of the first layer 114 are retained by a retainer 104. In at least one embodiment, such as is shown in FIG. 1, the retainer 104 has a surface or plurality of surfaces 130 which are in substantially tangential contact with the bearings 112 in the first layer 114. In some embodiments, a spring, coil, flexible member or other biasing member 103 desirably biases one or more surfaces 130 of the retainer 104 against the first layer 114. In some embodiments the retainer 104 may comprise an inner wall 132 that defines the surface 130. The inner wall 132 is substantially vertical in a region of contact with the bearings 112.

Figure 9:
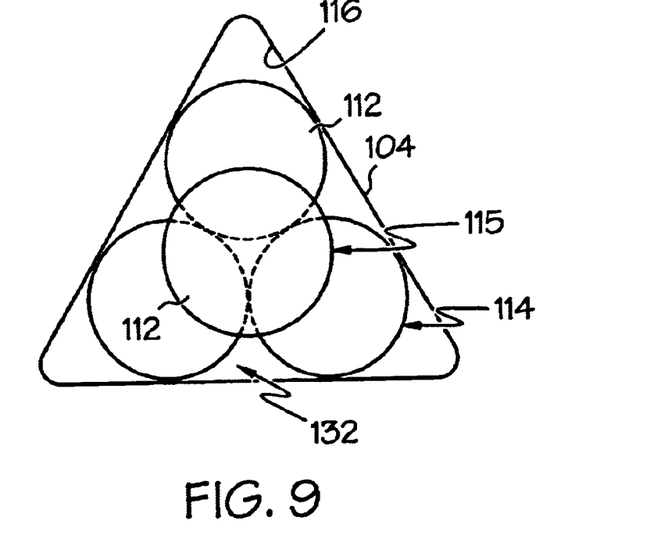
FIG. 9 shows a top down view of an embodiment of the invention.
Figure 10:
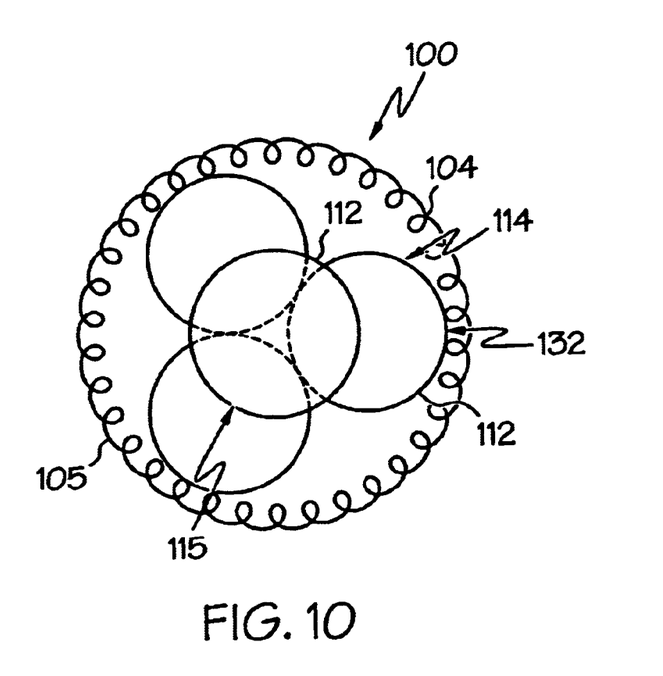
FIG. 10 shows a top down view of an embodiment of the invention.

The retainer 104 may be provided in a number of different forms. In one form, as shown in FIG. 1, the retainer is in the form of a collar, desirably, annular. The retainer 104 may also take other forms. By way of non-limiting examples, the retainer 104 may be in polygonal form whether it is triangular, as shown in FIG. 9, square or rectangular, pentagonal, hexagonal or other polygonal shapes. The retainer 104 may also be provided in the form of a coil 105 such as is shown in FIG. 10. In such a form, a portion of a spring or other biasing member may be used to house the bearings as long as the springs extends high enough to retain the bearings. Also, a plurality of interconnected springs disposed about the bearings may be used as a retainer.

Figure 11:
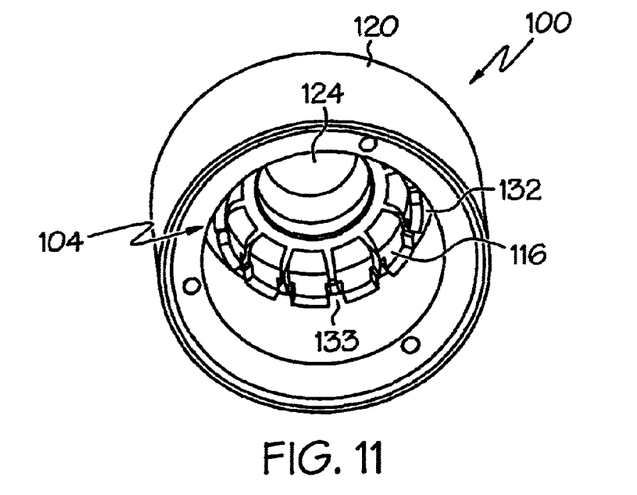
FIG. 11 shows a bottom perspective view of an embodiment of the invention.

The retainer 104, and more particularly a portion of the retainer 104 such as inner wall 132, may be made of a resilient material or of a material which is made resilient by any suitable means. Examples of the former include rubber and other materials which include resilient polymers. Examples of the latter include a piece of material, resilient or otherwise, which is provided with a plurality of slits or cuts therethrough such that portions of the device can move relative to other portions including, for example, by providing a plurality of slits therein. As an example of the latter, as best shown in FIG. 11, wall 132 of the retainer 104 may be formed of a plurality of adjacent spaced members or petals 116. In the embodiments of FIGS. 1–3 and 11 a plurality of petals 116 is disposed about the first layer 114 of bearings 112. It is within the scope of the invention to have any number of petals 116. In at least one embodiment, the retainer 104 will have from four to twenty petals 116. In some embodiments, the retainer 104 will have from eight to twelve petals 116.

In some embodiments suitable materials for constructing the retainer 104 may include Delrin and stainless steel, aluminum, rubber (both natural and synthetic), etc.

As is shown in FIG. 11, the retainer 104 may also be constructed using a plurality of spaced pads or petals 116 attached thereto to form the wall or enclosure 132 in which bearings may be received and retained. As used herein, the term 'enclosure' allows for the possibility of gaps or slits 133 between the pads or petals 116, as long as the gaps are small enough that the bearings are retained within the enclosure.

In some embodiments one or more springs or other biasing members are positioned radially behind the individual petals 116 to bias the petals against the bearings.

In another embodiment, the wall or enclosure of retainer may be provided in the form of three or more resilient pins.

In yet another embodiment, the retainer wall may be in the form of a plurality of opposing magnets. In the latter case, a magnetic field is used to maintain the bearings in place with or without physical contact between the bearings and the magnets.

Typically, the inventive devices will be used in combination with vibration or shock sensitive equipment such as various audio devices, optical devices, etc. Desirably, as shown in FIG. 8, three or more of the inventive devices 100 are used to isolate an audio, optical, photographic, electronic, and/or other components 128. Multiple components 128 can be incorporated together with a plurality of devices 100. As such, combinations of components including, but not limited to: amplifiers, turntables, cd players, microphones, digital to analog devices, analog to digital devices, speakers, mixers, digital delay devices, projection televisions, satellite receivers, telescopes, microscopes, computer equipment, surveying equipment and other devices for the recording or reproduction of electronic signals, may be used alone or together in any combination with devices 100. More generally, the inventive devices may be used with any vibration sensitive equipment. The device 100 may also be used in combination with other existing vibration dampening or absorbing devices.

To that end, the invention is also directed to the combination of an audio, optical or photograph device including any of the components disclosed above and the inventive devices disclosed herein.

The invention is also directed to any of the above disclosed components comprising a plurality of supports. Each support comprises a retainer, desirably in the form of collar, resting on a base and a plurality of bearings disposed within the retainer and arranged in a first layer and a second layer. The second layer is disposed on the first layer. The first layer comprises three or more bearings and the second layer comprises a bearing. The retainer has an inner surface in contact with the bearings in the lower layer. Desirably, the inner surface is in the form of a wall which is substantially vertical in a region of contact with the bearings. The bearings in the first layer support the bearing(s) in the second layer.

The inventive devices disclosed herein can be used as supports underneath any of the components disclosed herein and can also be in contact with and above any of the components disclosed herein. For example, where a component is mounted to a support surface from above, the inventive devices may be placed above the component and beneath the support surface. Similarly, the inventive devices disclosed herein may be oriented vertically and in contact with the sides of any of the above components.

Figure 12:
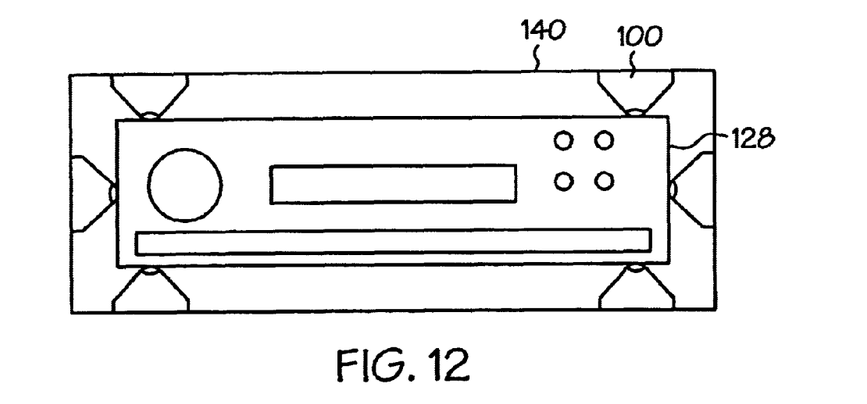
FIG. 12 shows a frontal view of an embodiment of the invention.

As an example of the above, a cd player or other component 128 to be used in a motor vehicle such as car or a truck, may be provided with one or more of the inventive device 100 underneath, above and/or on the sides of the cd player 128 to engage a portion of the vehicle 140, such as is shown in FIG. 12.

Figure 13:
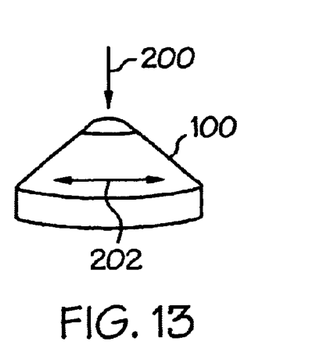
FIG. 13 is a schematic illustration of the conversion of vibrations in an embodiment of the inventive device which has been mounted horizontally.
Figure 14:
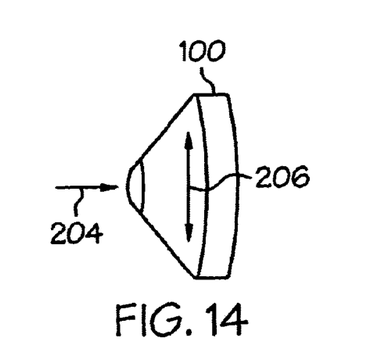
FIG. 14 is a schematic illustration of the conversion of vibrations in an embodiment of the inventive device which has been mounted vertically.

Without being bound by theory, the arrangement of bearings in combination with the retainer is believed to allow for efficient conversion of vibrations extending in a first direction to vibrations extending in a second orthogonal direction. The vibrations are then damped by the retainer. When the device is placed below or above an audio, optical or other component disclosed herein, vertical vibrations, indicated by arrow 200, are believed to be converted into horizontal vibrations, indicated by arrow 202, which are then dissipated by the device 100 as illustrated schematically in FIG. 13. When the device 100 is placed alongside an audio, optical or other component disclosed herein, horizontal vibrations, indicated by arrow 204, are believed to be converted into vertical vibrations, indicated by arrow 206, as shown schematically in FIG. 14.

In the various embodiments described herein, one or more components such as bearing 112, retainer 104, housing 120 etc., may be at least partially constructed from a material such as Lexan polycarbonate, plastics, and other materials suitable for aiding in the dampening of vibrations or shocks.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

We claim:

1. A device for the control of vibrations comprising:
   a retainer, the retainer constructed and arranged to rest upon a base, at least a portion of the base defining a substantially flat surface; and
   a plurality of bearings disposed within the retainer, the bearings arranged in a first layer and a second layer, the second layer disposed on the first layer, the first layer comprising three or more bearings, and the second layer comprising at least one bearing, each bearing in the first layer constrained on its bottom by only the substantially flat surface of the base, on its side by the retainer, the bearings in the first layer supporting the at least one bearing in the second layer, the retainer defining a surface which is in substantially tangential contact with the bearings in the first layer.

2. The device of claim 1 wherein each bearing of the first layer being in contact with at least one other bearing of the first layer.

3. The device of claim 1 wherein the retainer defines an inner wall in contact with the bearings in the first layer, the inner wall being substantially vertical in a region of contact with the bearings.

4. The device of claim 1 wherein the retainer is in the form of a collar.

5. The device of claim 4 wherein the collar defines at least one biasing member.

6. The device of claim 1 wherein at least a portion of the retainer is made of a resilient material.

7. The device of claim 1 further comprising at least one biasing member, the at least one biasing member biasing at least a portion of the retainer into contact with the first layer.

8. The device of claim 1 wherein the retainer defines a plurality of slits.

9. The device of claim 1 wherein the bearings are made of at least one material selected from the group consisting of tungsten carbide, aluminum oxide and any combination thereof.

10. The device of claim 1 further comprising a housing, the housing defining an opening, the retainer and bearings disposed within the housing, a portion of the second layer extending through the opening.

11. In combination, at least one audio component and three or more devices as in claim 8, the at least one audio component resting on the three or more devices.

12. In combination, an electronic component and three or more devices as in claim 8, the electronic component resting on the three or more devices.

13. The combination of claim 12 wherein the electronic component is selected from at least one member of the group consisting of amplifiers, turntables, cd players, microphones, digital to analog devices, analog to digital devices, speakers, mixers, digital delay devices, televisions, satellite receivers, telescopes, microscopes, computer equipment, surveying equipment, devices for the recording or reproduction of electronic signals and any combination thereof.

14. In combination, an optical component and three or more devices as in claim 8, the optical component resting on the three or more devices.

15. The combination of claim 14 wherein the optical component is selected from the group consisting of amplifiers, turntables, cd players, microphones, digital to analog devices, analog to digital devices, speakers, mixers, digital delay devices, projection televisions, satellite receivers, telescopes, microscopes, computer equipment, surveying equipment and other devices for the recording or reproduction of electronic signals.

16. In combination, a component selected from the group consisting of audio components, and optical components and three or more devices as in claim 1, the audio component resting on the three or more devices.

17. The device of claim 1 further comprising a third layer, the third layer comprised of at least one bearing, the first layer in contact with the second layer, the second layer in contact with the third layer.

18. The device of claim 1 wherein the second layer consists of a single bearing, the bearing supported by each of the bearings in the first layer.

19. The device of claim 18 further comprising at least one elongate member, the at least one elongate member engaged to the single bearing of the second layer.

20. The device of claim 1 wherein at least one of the plurality of bearings are substantially spherical in shape.

21. The device of claim 1 wherein each of the bearings in the first layer are substantially spherical in shape.

22. The device of claim 1 wherein each of the bearings in the first layer are of substantially the same size and shape.

23. The device of claim 1 wherein the retainer is annular.

24. The device of claim 1 wherein the second layer comprises a bearing which is larger than each of the bearings in the first layer.

25. The device of claim 1 wherein the retainer includes a plurality of petals.

26. The device of claim 1 wherein the base comprises at least one bearing, a portion of each of the bearings of the first layer being in contact with the at least one bearing of the base.

27. The device of claim 26 wherein the base further comprises a base member, at least a portion of the base member in tangential contact with the at least one bearing of the base.

28. The device of claim 1 wherein at least one of the bearings defines a substantially flat surface.

29. The device of claim 1 wherein the base member is selected from the group consisting of a shelf, floor, table, and any combination thereof.

30. The device of claim 1 wherein the base comprises a first base member and a second base member, the first base member being moveable relative to the second base member, at least a portion of the first base member in moveable and tangential contact with the bearings of the first layer.

31. The device of claim 10 wherein the base comprises a first base member and a second base member, the first base member being moveable relative to the second base member, at least a portion of the first base member in moveable and tangential contact with the bearings of the first layer, the housing defining an annular space, the annular space having a diameter greater than that of the first base member, the first base member positioned within the annular space and moveable therein.

32. The device of claim 31 further comprising a lubricious layer, the lubricious layer positioned between the first base member and the second base member.

33. The device of claim 32 wherein the first base member floats upon the lubricious layer.

34. The device of claim 31 wherein the second base member is engaged to the housing.

35. A vibration sensitive device comprising a plurality of supports, each support comprising a retainer resting on a base and a plurality of bearings disposed within the retainer and arranged in a first layer and a second layer, the second layer disposed on the first layer, the first layer comprising three or more bearings, the second layer comprising a bearing, the retainer having a surface which is in substantially tangential contact with the bearings in the first layer, the bearings in the first layer supporting the bearing in the second layer.

36. The vibration sensitive device of claim 35 wherein the retainer is in the form of an annular collar.

37. The vibration sensitive device of claim 36 wherein the collar has an inner wall in contact with the bearings in the first layer, the inner wall being substantially vertical in a region of contact with the bearings, the bearings in the first layer supporting the bearing in the second layer.

38. The vibration sensitive device of claim 37 in the form of a cd player, a speaker, a microphone or a turntable.

39. The vibration sensitive device of claim 35 comprising three or more supports.

* * * * *